(12) United States Patent
Caudron et al.

(10) Patent No.: US 9,530,322 B2
(45) Date of Patent: Dec. 27, 2016

(54) CONTEXTUAL AID TO FLIGHT MANAGEMENT

(71) Applicant: THALES, Courbevoie (FR)

(72) Inventors: Bertrand Caudron, Toulouse (FR); Sonia Vautier, Toulouse (FR); Patrick Mazoyer, Toulouse (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/862,431

(22) Filed: Sep. 23, 2015

(65) Prior Publication Data

US 2016/0093223 A1 Mar. 31, 2016

(30) Foreign Application Priority Data

Sep. 26, 2014 (FR) ...................................... 14 02167

(51) Int. Cl.
| | | |
|---|---|---|
| *G08G 5/00* | (2006.01) | |
| *B64D 45/00* | (2006.01) | |
| *G01C 23/00* | (2006.01) | |
| *G01D 7/00* | (2006.01) | |
| *G08G 5/02* | (2006.01) | |

(52) U.S. Cl.
CPC ............. *G08G 5/0039* (2013.01); *B64D 45/00* (2013.01); *G01C 23/005* (2013.01); *G01D 7/00* (2013.01); *G08G 5/0021* (2013.01); *G08G 5/0047* (2013.01); *G08G 5/0052* (2013.01); *G08G 5/0065* (2013.01); *B64D 2045/0075* (2013.01); *G08G 5/025* (2013.01)

(58) Field of Classification Search
CPC ................................ G08G 5/003; G01C 23/00
See application file for complete search history.

(56) References Cited

U.S. PATENT DOCUMENTS

| | | | |
|---|---|---|---|
| 7,787,999 B1 | 8/2010 | Barber | |
| 7,961,135 B2 * | 6/2011 | Smith | ..................... G01S 7/062 342/29 |
| 8,417,397 B2 * | 4/2013 | Khatwa | .................. G01C 23/00 701/14 |
| 8,554,394 B2 * | 10/2013 | Shamasundar | ...... G08G 5/0021 701/14 |

(Continued)

FOREIGN PATENT DOCUMENTS

| | | |
|---|---|---|
| EP | 2 296 127 A1 | 3/2011 |
| FR | 2 904 461 A1 | 2/2008 |

(Continued)

*Primary Examiner* — Thomas Tarcza
*Assistant Examiner* — Alex C Dunn
(74) *Attorney, Agent, or Firm* — Baker & Hostetler LLP

(57) ABSTRACT

A method implemented by computer for the management of the flight of an aircraft comprises the steps of receiving flight directives and flight information associated with these directives; determining a flight context of the aircraft; as a function of the context determined, selecting information from among that associated with the formulation of a directive and/or with a current flight directive and/or with a change of a flight directive; sensorially restoring the selected information. Various developments are described, notably links to documentary resources, the determination of anomalies, the use of predefined logic rules and configuration options. System aspects and software aspects are described.

14 Claims, 6 Drawing Sheets

(56) References Cited

U.S. PATENT DOCUMENTS

| | | | |
|---|---|---|---|
| 8,655,507 B2* | 2/2014 | Coulmeau | G08G 5/0039 |
| | | | 340/945 |
| 9,174,744 B2* | 11/2015 | Depape | B64D 45/00 |
| 2005/0232512 A1* | 10/2005 | Luk | G06K 9/6293 |
| | | | 382/276 |
| 2011/0109576 A1 | 5/2011 | Giannelli | |
| 2011/0118908 A1* | 5/2011 | Boorman | G08G 5/0021 |
| | | | 701/14 |
| 2012/0130563 A1* | 5/2012 | McBain | B64D 45/0015 |
| | | | 701/3 |
| 2012/0215386 A1* | 8/2012 | Louise | G01C 23/00 |
| | | | 701/3 |
| 2012/0319869 A1 | 12/2012 | Dorfmann et al. | |
| 2013/0345905 A1* | 12/2013 | Parthasarathy | G01C 23/00 |
| | | | 701/3 |
| 2015/0019048 A1* | 1/2015 | Krishna | B64D 45/00 |
| | | | 701/4 |
| 2015/0022380 A1* | 1/2015 | Conner | B64D 45/00 |
| | | | 340/967 |

FOREIGN PATENT DOCUMENTS

| | | |
|---|---|---|
| FR | 2 952 466 A1 | 5/2011 |
| WO | 02/40943 A2 | 5/2002 |

\* cited by examiner

/ 400

| /410 | /420 | /430 | /440 | /450 |
|---|---|---|---|---|
| Flight phase | Condition (example) | Display (example) | Display content | Hyperlink |
| Before liftoff | Preflight or ((take off) and (Vc<VR) and (main landing gear pressed) | V1 139 VR 141 V2 142 | - V1, VR, V2 speeds<br>- attention getter in case of incorrect or missing entry | - takeoff / departure page |
| cruise | CSS active | .77 (LMG) in456nm .78 (CI30) | - current speed target & CSS exit fix ID<br>- distance to next speed target change<br>- next speed target & rationale | - constant speed segment page<br>- cruise mode revision page |
| descent | OPT/RTA → SPD LIM | 278 (CI30) In 25nm 250 (FL100) | - current speed target & optimization criteria<br>- distance to next speed target change<br>- next speed target & speed limit altitude<br>- attention getter when near or speeding | - descent mode revision page<br>- speed limit revision tab or page |
| ... | ... | ... | ... | ... |

FIG. 4

| Flight phase | Condition (example) | Display (example) | Display content | Hyperlink |
|---|---|---|---|---|
| Before climb | aircraft is below acceleration altitude | FLEX 42°C At 1500ft D2 CLB THR | - take off engine rating<br>- thrust reduction altitude<br>- climb thrust rating | - takeoff / departure page |
| climb | Altitude constraint ahead which requires a level off (e.g. TOU) | In 24nm: 4000ft TOU | - distance to level off<br>- altitude value<br>- waypoint ID | |
| cruise | S/C or S/D in progress A step climb or descent is in progress | In 8nm: FL 350 CRZ | - distance to level off<br>- step altitude<br>- attention getter if step altitude cannot be reached before top of descent | |
| descent and initial approach | altitude constraint ahead which requires more drag (e.g. AMB) | In 24nm: 8000Ft 3,3° | - distance to constraint<br>- required flight path angle<br>- altitude error<br>- recommended speed brake<br>  - attention getter<br>  - altitude value<br>  - waypoint ID | - constraint revision tab at waypoint |
| ... | ... | ... | ... | ... |

FIG. 5

CONTEXTUAL AID TO FLIGHT MANAGEMENT

CROSS-REFERENCE TO RELATED APPLICATIONS

This application claims priority to foreign French patent application No. FR 1402167, filed on Sep. 26, 2014.

FIELD OF THE INVENTION

The invention lies in the field of man-machine interfaces for piloting or guiding an aircraft along a trajectory.

PRIOR ART

Traditionally, the part of avionics that is dedicated to piloting consists of the flight management system (FMS), automatic pilot (AP) and auto-throttle (ATHR) systems. These systems have been used for some thirty or so years to delegate the slaving of the aircraft to its trajectory and improve flight safety.

Their behaviour must correspond to the intention of pilots. Indeed, any mismatch between a pilot's perception and the real state of the systems is liable to lead the aircraft onto an inappropriate trajectory.

The solutions which are known attempt to allow the crew to understand the "intention" of the automatic guidance systems by means of various displays (PFD principal flight screen, ND/VD navigation screen, MFD multifunction screen). Pilots interpret the information presented on these various screens present in the cockpit.

These displays present limitations. The latter stem not only from weaknesses with regard to the presentation of information (i.e. its layout) but especially from technical sub-optimizations with regard to its contents (e.g. hierarchization, extraction, fusion of information, feedbacks according to the interactions, etc) which entail ineffectualities and therefore ultimately cognitive overload of pilots, all of which consequences are damaging to flight safety.

In particular, the imperfections of form and of background of the information displayed (necessary for the understanding of the systems) sometimes entails expensive training of personnel and generally involves a need for increased vigilance of the crew. The proposed solution is aimed at maintaining a satisfactory safety level with a lesser workload for the pilot (as well as less expensive training).

U.S. Pat. No. 7,787,999 discloses a method of displaying data of a flight controls system (FMS) and an avionics system configured to implement this process. The method comprises notably the display of a banner ("strip") representing the intention associated with the manoeuvre in progress. The banner comprises various combinations of directives, of icons and of arrows. The disclosure deals only with altitude constraints. Many other types of information are not handled.

There exists in the industry a need for advanced processes and systems for the definition and the management of flight trajectories within the equipment present in the flight cabin of an aircraft (or of the cabin for remote-piloting of a drone).

SUMMARY OF THE INVENTION

There is disclosed a method implemented by computer for the management of the flight of an aircraft comprising the steps of receiving flight directives and flight information associated with these directives; determining a flight context of the aircraft; as a function of the said context determined, selecting information from among that associated with the formulation of a directive and/or with a current flight directive and/or with a change of a flight directive; sensorially restoring the selected information.

The (sensory) restoration of the selected information allows notably the pilot to understand the flight information that the aircraft will follow when the pilot has delegated the piloting thereof to the FMS regarding one or more of the directives. Accordingly, better piloting decisions can be taken.

An aspect of the invention is aimed at advising the pilot regarding the state of the systems of the aircraft, at the present ("that the system is currently doing") and in the future ("that the system will do shortly"), while also explaining if necessary the underlying links between these various actions (the "why", i.e. the causality of the states).

There is disclosed a method implemented by computer for the management of the flight of an aircraft. In a very general manner, the method arbitrates the quantitative and qualitative aspects as regards user interface or man-machine interaction. In particular, the method can continually adjust the "quantity" of information or of data restored to the pilot and the "quality" of this information or data (that is to say by determining or controlling the nature or the category or indeed the content of the information).

More precisely, the method according to the invention analyses the current directive and the next change in each category of directive (e.g. horizontal, vertical, thrust, speed).

The directives are for example received from a flight management system (which is for example of FMS type, the acronym standing for "Flight Management System"). Directives can be received from a system other than an FMS.

The directives are constraints or orders or objectives or recommendations emitted by the onboard computer or FMS destined for the pilot and/or the navigation systems of the aircraft when the latter is slaved to the said systems by coupling of the flight controls or any other mechanism of servo-controls. The pilot remains sole decision-maker on board, but he can nonetheless delegate the slaving of the aircraft to the navigation systems. Therefore, barring intervention on his part, the directives are commands whose fulfilment is practically certain. An aspect of the invention is therefore aimed at affording the pilot the means of verifying that delegation of the slaving takes place correctly. Stated otherwise, the pilot has the last word on condition of intervening, in so far as usually he will "delegate" the piloting actions to the onboard systems. Fulfilment of the directives is therefore certain, barring intervention on the part of the pilot. Advantageously, the method according to the invention gives the pilot the means to verify that delegation takes place correctly.

Several types of directives exist. The "flight" directives are "nominal" directives, for example "output" by the FMS. The "piloting" directives are the directives considered by pilots, for example "input" directives. Certain directives can form the subject of "delegation" i.e. be interpreted by specific avionics systems suitable for their handling and/or execution.

Classification of the directives can be done by various means. The directives can be innately associated with metadata indicating their category or their group of membership (stated otherwise the type of directive can be predefined). The classification can also result from analysis work on the data received (detection of keywords, or heuristic analyses, "taggers", "classifiers", etc). The directives received belong essentially to three principal groups or classes or categories, but the invention is not limited to the management of these three groups alone (a finer subdivision of the categories is possible). It is advantageous to handle these three groups of directives since they generally make it possible to provide the necessary and sufficient information to the pilot to ensure appropriate management of the flight of the aircraft.

A first group of directives comprises the directives relating to navigation and/or positioning (e.g. spatial coordinates, maps, flight plan, flight plan points, etc). A second group of directives comprises the directives relating to guidance in the horizontal plane and/or the vertical plane (e.g. climb, descent, change of holding levels, etc). A third group of directives comprises the directives relating to speed and/or thrust (e.g. approach speed, descent speed, transition speed, etc).

The method comprises logic methods or steps making it possible moreover to determine the "flight context" or "current flight context" of the aircraft.

The flight context at a given moment incorporates the set of actions taken by the pilots (and notably the effective piloting directives) and the influence of the exterior environment on the aircraft.

A "flight context" comprises for example a situation from among predefined or pre-categorized situations associated with data such as the position, the flight phase, the waypoints, the procedure in progress (and others). For example, the aircraft may be in the approach phase for landing, in the takeoff phase, in the cruising phase but also in an ascending holding level, a descending holding level, etc (a variety of situations can be predefined). Moreover, the current "flight context" may be associated with a multitude of attributes or descriptive parameters (current meteorological state, state of the traffic, status of the pilot comprising for example a stress level such as measured by sensors, etc).

A flight context can therefore also comprise data, for example filtered by priority and/or based on flight phase data, meteorological problems, avionic parameters, ATC negotiations, anomalies related to the status of the flight, problems related to the traffic and/or to the relief. Examples of "flight context" comprise for example contexts such as "cruising regime/no turbulence/nominal pilot stress" or else "landing phase/turbulence/intense pilot stress". These contexts can be structured according to diverse models (e.g. hierarchized for example as a tree or according to diverse dependencies, including graphs). Categories of contexts can be defined, in such a way as to summarize the needs in regard to man-machine interaction (e.g. minimum or maximum interaction lag, minimum and maximum quantity of words, etc). Specific rules may also persist in certain contexts, notably emergencies or critical situations. The categories of contexts can be static or dynamic (e.g. configurable).

The method comprises means for determining a flight context of the aircraft, the said determination means comprising in particular logic rules, which handle values such as measured by means of physical measurement. Stated otherwise, the means for determining the "flight context" comprise system means or "hardware" or physical/tangible means and/or logic means (e.g. logic rules, for example predefined). For example, the physical means comprise the avionics instrumentation in the proper sense (radars, probes, etc) which make it possible to establish factual measurements characterizing the flight. The logic rules represent the set of processings of the information making it possible to interpret (e.g. to contextualize) the factual measurements. Certain values may correspond to several contexts and by correlation and/or computation and/or simulation, it is possible to decide between candidate "contexts", by means of these logic rules. A variety of technologies makes it possible to implement these logic rules (formal logic, fuzzy logic, intuitionist logic, etc).

As a function of this context such as determined by the method, the method according to the invention "sensorially" restores information whose selection is chosen carefully or "intelligently". By sensory restoration, it is understood that the information can be restored by various cognitive modes (vision, hearing, haptic feedback i.e. tactile/vibrational, etc) and/or according to a combination of these modes. A single cognitive sense can be solicited (for example via solely the graphical display of the information), but according to certain embodiments, multimodal restoration can be performed (graphical display and simultaneously or in an asynchronous manner transmission of vibration via suitable devices, for example to the pilot's wrist). Advantageously, multimodal restoration allows a certain robustness of communication of the flight directives to pilots. For example, if it is likely that an item of information has not been taken into account, reminders using a different combination of cognitive modes can be performed.

The information restored—which is dependent on context—can comprise one or more items of information from among the following ("and/or"): a selection of directives (i.e. one or more directives) from among the directives received, information associated with the said directives received, changes of directives such as planned by the flight management system, information associated with the said changes of directives, and/or information associated with an anomaly of the flight of the aircraft. Selection of directives can be performed by diverse means. By means of predefined rules, the most relevant directives can be selected. Predefined thresholds or predefined spans of thresholds can be used. Information associated with the selected directives can be displayed, according to the same principles of rules, thresholds and scores. In particular the most compact information can be restored in one manner or another, for example where it is pre-established that the said information is necessary and sufficient for justifying (explaining the "why") a given directive. This may entail providing the source of the directive or else a link (text hyperlink or video or other hyperlink) to a documentary resource that is relevant as regards the content of the directive or of its category. Information relating to one or more changes of directives, such as planned by the system, may be restored. The temporal or sequenced aspect of these directives can therefore be taken into account. In a similar manner, metadata or complementary information can be provided. According to one aspect of the invention, there is indeed disclosed a method aimed at conferring a "depth of view" in regard to piloting. In a similar manner, information which is "necessary and sufficient" to explain the forthcoming changes of directive can also be restored sensorially. Finally, still for example and in a non-limiting manner, information associated with possible anomalies as regards these directives (or their context) can also be restored sensorially.

There may be a selection of selections: for example, directives may be selected first, at the same time as other information relating to future events of the flight is also selected; a super-selection can thereafter be performed, so as to obtain synthetic information summarized to the pilot. The selections can notably be performed by systems based on rules and/or on systems using weighting (e.g. "scoring", etc).

There is no requirement whatsoever to provide all of the previously cited information. As a function of the flight context, for example in an emergency situation, it is entirely acceptable to provide a quantitatively much reduced item of information. When the situation so allows, such as determined by the set of logic rules governing the man-machine interaction, it will on the other hand be possible to display more information. The invention requires the restoration of "at least" one of the previously cited items of information. Optionally, the management of the display rules can be supervised or tempered or weighted by the application of a "counter" of restored directives (i.e. quantitatively).

Stated otherwise, there is disclosed a logic for selecting and choosing information to be presented to the crew as a function of the flight context. The content of the piloting directives (the "which", the "present") are presented to the crew. Predefined rules make it possible to operate the selection of directives to be displayed, for example as a function of the flight phases. Associated information, making it possible to understand the "why" (e.g. the "past") of these directives, is also displayed, if appropriate (if the data are available). The information explaining the directives selected can for example comprise data or reasons (e.g. documentation pages) or causality links explaining or justifying these objectives or directives. Furthermore, information relating to planned changes in regard to directives can be provided (the "future"). For example, the information relating to the directives to be followed, e.g. the next directive or the plurality of directives which will follow). The future directives, if appropriate, are presented with temporal indications associated with the changes of directive, and if possible are accompanied by the presentation of contextual or causality explanations. Only the information strictly necessary as regards the background (with respect to predetermined criteria) is presented, and in the most intelligible possible manner as regards the form.

In a development, a flight directive is of navigation/positioning type, and/or of guidance type in the horizontal/vertical plane and/or of speed/thrust type, the said flight directive being received from a flight management system or FMS.

Generally, the directives are hierarchized (trees or graphs). The directives can be of various levels of abstraction. For example, a thrust/speed directive can be associated with a control surface directive. The invention advantageously finds application in respect of the "elementary" directives or those of high level of abstraction, i.e. the "navigation/positioning", horizontal/vertical guidance or "speed/thrust" categories (but is not limited to these categories of directives alone).

In a development, the flight information comprises information associated with the formulation of one or more flight directives and/or information associated with the state of the systems of the aircraft and/or information associated with the environment of the aircraft.

For example, the information relating to the systems of the aircraft comprises information regarding flight plan, flight phase, lateral trajectory, vertical trajectory, values or predictions in terms of altitude, speed, time, fuel and/or of flight phase type. The information relating to the exterior environment comprises meteorological data, information associated with the air traffic, terrain data, etc. The associations can be static (e.g. tables) or else algorithmic.

In a development, the step of sensorially restoring the selected information comprises a step of graphically displaying one or more items of information from among (a) a speed (b) a thrust (c) a flight phase directive (d) a directive in terms of slope (e) a ceiling or floor (e) a flight criterion (f) an aerodynamic configuration and (g) a flight procedure.

The information restored to the pilot can comprise the display of various combinations of information, for example the display at one and the same instant of several speeds, of a ceiling information item and of an aerodynamic configuration.

In a development, the method furthermore comprises a step of providing a link to a resource in relation to a selected directive.

The explanations or information can be "hierarchized" in so far as the method can provide fast contextual access to the appropriate FMS pages, on which are found additional details (conferring a depth of view for the pilot, for example at his request). In one embodiment, the resource is of a documentary nature. For example the link to the additional resource is a textual hyperlink clickable or activatable on the screen. In another embodiment, the link is a video hyperlink. In another embodiment, the resource called or which may be called is a computation resource (e.g. "applet" that is to say an executable program). In other embodiments, graphical icons or symbols are used. The links or hyperlinks may be in particular dynamic (i.e. defined as a function of the flight context, pre-empting or anticipating the information needs for piloting). The method according to the invention constitutes an aid to piloting in that it models and therefore anticipates the essential needs of the pilot. In case of mismatch with a real situation (for example more complex or quite simply different from that modelled), means can allow the "disengagement" of the piloting aid systems such as are described below.

In a development, the method furthermore comprises steps of receiving or detecting or determining a flight anomaly and in soliciting the aircraft pilot's attention.

In one embodiment, a flight anomaly (or more generally a "flight event") can be received (for example given as such by an external system) and/or detected (for example by applying static predefined criteria) or else determined (for example by applying complex criteria and predefined, dynamic thresholds e.g. sensitive to flight context).

The method in a particular embodiment therefore discloses a logic to identify data or a flight context exhibiting an abnormal character (with respect to reference or standard data), so as to attract or to solicit the attention of the crew. For example, from the synthetic display presented to the pilot, it will be possible for use to be made of visual stratagems (colours, blinking, alert symbols) and/or auditory and/or tactile or vibrational stratagems. In a complementary manner, it will be possible for links to additional or complementary resources (e.g. hyperlinks) to be presented, conferring on the pilot an investigation capacity, at his request or upon his confirmation.

For example, it is possible to monitor ("current", i.e. present) parameters such as parameters termed "Aircraft Parameters" (e.g. deviation of the aircraft attitude with respect to what is envisaged, overconsumption i.e. deviation of the mass, deviation of the position or of the speed of the aircraft with respect to a speed directive in turbulent mode, margins with respect to stalling, electrical power available etc.), parameters termed "Aircraft controls" (e.g. deviation between the current lateral/vertical/speed manoeuvre and what is computed and optimized by the systems) or else in regard to so-called "Flight plan conformance" parameters (e.g. the deviation between the planned altitude and the real altitude, or the deviation between the planned speed and the real speed).

In regard to future events, it is possible to monitor or track the parameters relating to the trajectory projected into the future, the future deviation estimated in time (i.e. flight speed problem), the future deviation estimated in altitude (e.g. ATC problem or congestion), the future deviation in altitude or the speed due to the predicted weather, etc.

In a development, the flight context is determined in a manner repeated (or recurrent or intermittent) over time.

The flight context can be determined in a manner repeated over time (e.g. every N seconds, and/or according to actions of the pilot, and/or at the various waypoints or flight plan points and/or at other points not necessarily associated with the waypoints). The method is not exclusively dependent on the flight plan points.

The flight context directly influences the type of display to be performed within the cockpit. The flight context comprises various flight phases and can be associated with other parameters (for example parameters of a meteorological nature). For example, a particular flight context can comprise the parameters "take off" and "storm". The appropriate definition or determination of this flight context is repeated or recurrent over time (i.e. is determined several times in the course of time) and can be triggered according to different modalities. Various embodiments are possible: the determination or the verification of the flight context can be done periodically, i.e. at substantially regular intervals or else aperiodically, i.e. in a discontinuous manner but as a function of the flight phases. The monitoring may for example be continuous, or more or less narrow as a function of the flight phases (e.g. intermittent).

Concerning the "flight context", a certain number of sub-varieties of contexts can be mentioned. The "context of the flight" can comprise for example the flight phase, the state of the onboard systems, the faults, the progress of the flight with respect to the flight dossier initially provided or the operational limitations of the craft. The "aircraft environment context" can for example comprise the meteorological context (e.g. "cunimb" for cumulonimbus, rain, turbulence, icing, high winds, etc), the terrain context (e.g. summits, passage above oceans, etc) and/or the traffic context (traffic density around the aircraft). The "ATC context" can for example comprise the description of the airspaces crossed, of the restrictions, of the traffic congestion and the "AOC context" can for example comprise information relating to the delay in the program of flights, faulty craft, sick passengers, etc.

In a development, the step of determining the flight context comprises the application of predefined logic rules.

In a development, the restoration of information is performed in a visual and/or auditory and/or tactile and/or vibratory manner. The five human senses can be solicited, in combination. For example, a luminous signal can be associated or combined with a mechanical vibration (transmitted by means of augmented reality for example) and the concomitant emission of a predefined sound (to the headset).

In a development, the step of determining the flight context comprises the application of predefined logic rules.

The determination of the flight context relies on values measured by the onboard instrumentation and/or received from the exterior (ATC, weather, etc). The determination can be static (local and/or exterior means, but invariant over time) or dynamic (taking into account exterior influences or control systems, for example varying over time). The determination can be complex (for example result from the application of a large number of rules, relating to the aircraft, its flight and also the pilots and the exterior environment of the aircraft).

In a development, the step of restoring information comprises the application of predefined logic rules.

The selection of directives can be static or dynamic (it may for example result from the application of rules, which may be different and specific to the said sensory restoration e.g. "scoring" of the best cognitive channels for communicating this or that category of information).

In a development, the step of restoring information is independent of the flight plan points. The flight points correspond to the "waypoints". The method according to the invention can display information relating to the flight points, or else to points which are not associated with the flight points.

In a development, the step of selecting information is configurable. The manner of selection can use processes or techniques or steps such as the employing of predefined tables, scoring techniques, weightings, analysis of graphs, heuristics, techniques of fuzzy logic, etc. Various parties can influence the mode of selection of the information (each in isolation or in a collaborative manner): the airline, the aircraft manufacturer, the air traffic control, the pilot himself, etc. It may for example be possible and advantageous for the air traffic control to be able to take control, at least partially, and optionally in a temporary manner, of certain settings of the man-machine interaction, in certain critical situations.

There is also disclosed a computer program product, comprising code instructions making it possible to perform one or more steps of the method, when the said program is executed on a computer.

There is also disclosed a system comprising means for implementing one or more steps of the method. In particular, the system can comprise a PFD principal flight screen and/or a ND/VD navigation screen and/or an MFD multifunction screen. According to a first embodiment, the method can be implemented on the principal page of the FMS on MFD (head-down). According to a second mode, the display is performed as an "extension" for example of the FMA on PFD (head-level) or on HUD (head-up). According to another mode, info-bubbles are displayed on the graphical objects of the ND (head-level)

In a development, as a supplement or by substitution, the system can comprise avionic means of Flight Management System type and/or means of Electronic Flight Bag type. In a development, as a supplement or by substitution, the system can comprise means of augmented reality (AR) and/or virtual reality (VR).

The means AR comprise, in particular, systems of HUD ("Head Up Display") type and the means VR comprise, in particular, systems of EVS ("Enhanced Vision System") or SVS ("Synthetic Vision System") type.

The proposed technical solution comprises in particular a logic system which makes it possible to identify, for example in real time, and at the very least in a concise, synthetic manner and as a function of context, the determining element for understanding the causality of the guidance directive (the "why").

Advantageously, the method according to the invention makes it possible to remedy the dispersion of the information displayed and/or to improve the hierarchization thereof and/or to contextualize this information, both improvements of form and of background which in their turn subsequently allow better interpretations on the part of the pilot, and, ultimately, faster actions and a more secure piloting.

The problem of the dispersion of the information in particular is—at least in part—solved by the synthesis of the relevant information as a function of context. Moreover, this synthetic information or information summarized with the aid of technical means and appositely (i.e. contextually) can be complemented with hyperlinks, if the crew wishes to access more details. For example it is possible to implement process steps (e.g. steps of display and/or confirmation) and/or their correspondence as regards system (display blinking, in colour, of size tailored to the pilot's field of vision, etc) so as to attract or to solicit (and more generally to manage) the pilot's attention, for example in case of pertinent anomaly. The problem of the readability of the information within the cockpit is at least in part solved by employing a representation that is clearer, better centralized, codified and that uses graphical symbols in addition to textual information. This better management of the man-machine interface produces measurable results, for example as regards response time of the pilot and reliability of the reactions engendered by the information system.

The solution makes it possible generally to respond to three interrogations simultaneously. Firstly, the current guidance directives are presented and justified. Thereafter, the forthcoming changes of directives and/or trajectory are presented and/or explained and/or anticipated. The "context" such as the information on the navigation (e.g. its "quality") is centralized and displayed. Finally, the abnormal character of certain data and/or contexts is identified. These restorations of information are performed in a synthetic manner, by hierarchizing the information, by alerting the attention of the crew in case of anomaly and by allowing fast access to the additional information necessary for diagnosis.

According to the embodiments, possibilities of interactions are implemented with the pilot or the crew. The solution proposes various logic: (a) for the selection and the choice of information to be presented to the crew as a function of the context, so as to present only what is strictly necessary in an intelligible manner; (b) for the formulation of dynamic hyperlinks which make it possible, on the basis of the currently displayed information, to access the appropriate page where the corresponding details may be found; (c) to identify the data or a context exhibiting an abnormal character, so as to attract the attention of the crew from the synthetic display by affording them the possibility of investigating further by virtue of the hyperlinks provided.

Several embodiments are possible (and can be combined). According to a first mode, the information is displayed according to an "information cartouche" for example on the principal page of the FMS on MFD (head-down). According to a second mode, the display is performed as an "extension" for example of the FMA on PFD (head-level) or on HUD (head-up). According to another mode, info-bubbles are displayed on the graphical objects of the ND (head-level).

Unlike in the prior art previously mentioned, the present invention presents numerous differentiating characteristics. For example, according to one embodiment of the invention, it is possible to undertake the display (a) of the speeds, (b) of the thrusts, (c) of the flight phase directives (e.g. "take off speed", "approach speeds", "THR RED ALT, ACCEL ALT"), (d) of the directives in terms of slope (for example −3°), (e) of the ceilings and floors (for example MDA, REC MAX, EO . . . ), (e) of the flight criteria (for example RTA, ECON . . . ), (f) of the aerodynamic configurations and (g) of the procedures (for example racetrack, approach, turnaround . . . ). According to one aspect of the invention and unlike in the prior art, the "current" and "following" manoeuvres are displayed within one and the same display, separating the lateral from the vertical aspect and from the speed, these events not being related to one another and not being related to waypoints. It becomes possible to warn the pilots of the change of manoeuvre either laterally, or vertically, or in terms of speed, or navigation quality, the various instants being decorrelated. Unlike in the prior art, one embodiment of the invention makes provision to employ hyperlinks making it possible to rapidly access the data in its entirety. One embodiment teaches the management of the navigation quality (EPU, RNP, RVSM . . . , GPS quality). Finally, certain embodiments of the invention detail the "why" of the display of a directive, as well as the conditions for the activation of the following directive. Concerning the altitudes, the display according to the invention may differ according to the source of the directive (e.g. CLR ALT or ALT CSTR) and the pilot can (for example) determine at a glance the reason for the vertical manoeuvre.

Advantageously, certain embodiments of the invention improve the conciseness of the information. Stated otherwise, the information is summarized and ultimately more readable. In particular, the information relating to the speed and the vertical trajectory is rendered easier to access.

The present invention will advantageously be implemented in a large variety of avionic environments, in particular on MMIs of CDS (Cockpit display systems) type, FMSs, onboard or ground-based mission systems for piloted aircraft or drones, EFBs (Electronic Flight Bags) or touchpad tablets. It can also be used with an onboard taxiing system (termed TAXI or ANF for Airport Function Navigation). The invention can also apply to the maritime or road context.

DESCRIPTION OF THE FIGURES

Various aspects and advantages of the invention will become apparent in support of the description of a preferred but nonlimiting mode of implementation of the invention, with reference to the figures hereinbelow:

FIG. 4 illustrates examples of screens relating to the speed directives;

FIG. 5 illustrates examples of screens relating to the directives of vertical evolution;

DETAILED DESCRIPTION OF THE INVENTION

Certain technical terms and environments are defined hereinafter.

The acronym (or initials) FMS corresponds to the conventional terminology "Flight Management System" and designates the flight management systems of aircraft, known in the state of the art through the international standard ARINC 702. During the preparation of a flight or during a rerouting, the crew undertakes the inputting of various items of information relating to the progress of the flight, typically by using an FMS aircraft flight management device. An FMS comprises input means and display means, as well as computation means. An operator, for example the pilot or the copilot, can input via the input means information such as RTAs, or "waypoints", associated with route points, that is to say points vertically in line with which the aircraft must pass. These elements are known in the state of the art through the international standard ARINC 424. The computation means make it possible notably to compute, on the basis of the flight plan comprising the list of waypoints, the trajectory of the aircraft, as a function of the geometry between the waypoints and/or altitude and speed conditions.

Hereinafter in the document, the acronym FMD is used to designate the textual display of the FMS present in the cockpit, generally disposed head-down (at the level of the pilot's knees). The FMD is organized into "pages" which are functional groupings of coherent information. Among these pages feature the "FPLN" page which presents the list of elements of the flight plan (waypoints, markers, pseudo waypoints) and the "DUPLICATE" page which presents the results of the navigation database searches.

The acronym ND is used to designate the graphical display of the FMS present in the cockpit, generally disposed at head level, i.e. in front of the face. This display is defined by a reference point (centred or at the bottom of the display) and a range, defining the size of the display zone.

The acronym MMI corresponds to Man-Machine Interface (or HMI, Human Machine Interface). The inputting of the information, and the display of the information input or computed by the display means, constitute such a man-machine interface. With known devices of FMS type, when the operator inputs a route point, he does so via a dedicated display displayed by the display means. This display may optionally also display information relating to the temporal situation of the aircraft in relation to the route point considered. The operator can then input and view a time constraint imposed for this route point. Generally, the MMI means allow the inputting and the consultation of the flight plan information.

Figure 1:
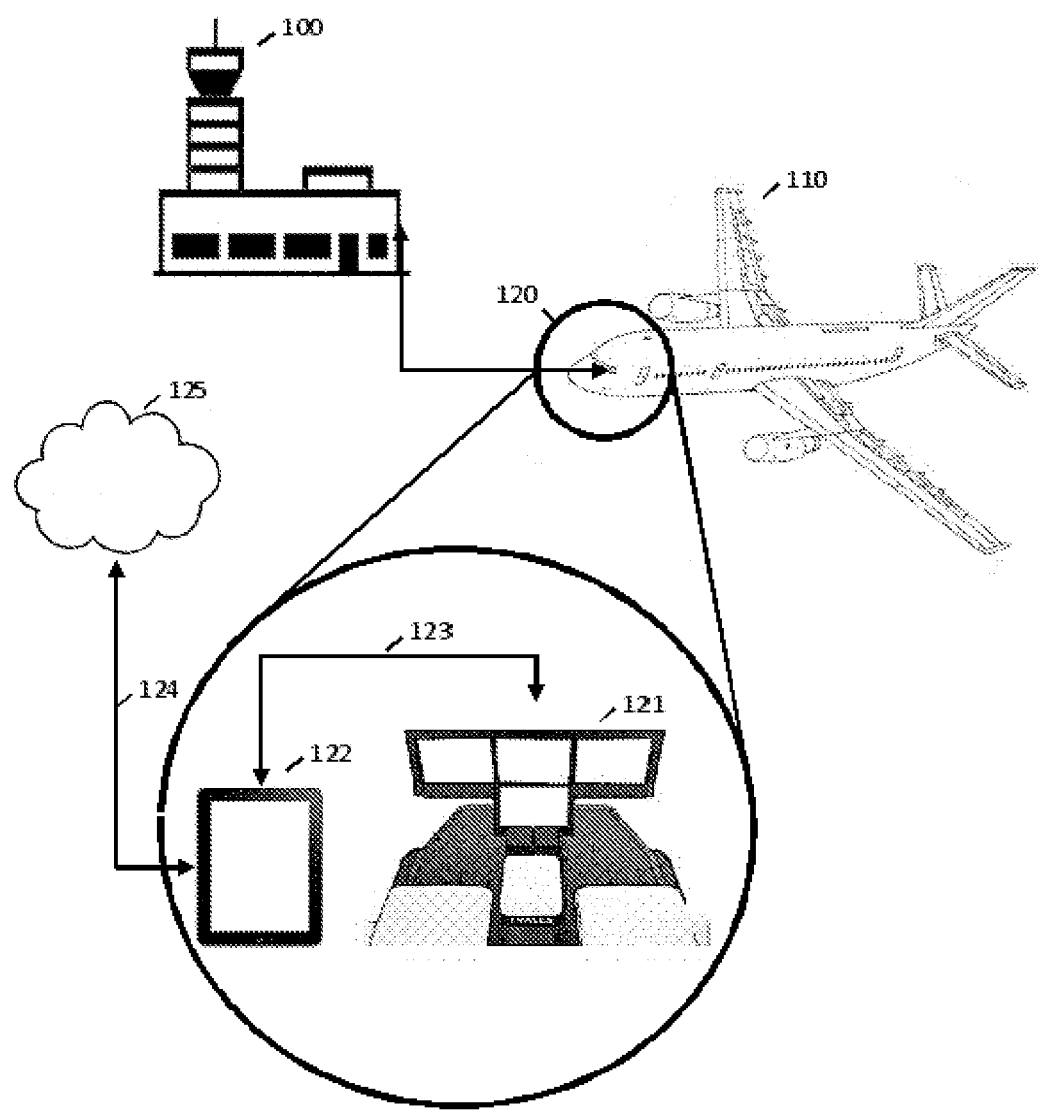
FIG. 1 illustrates the overall technical environment of the invention.

FIG. 1 illustrates the overall technical environment of the invention. Avionics equipment or airport means 100 (for example a control tower linked with the air traffic control systems) are in communication with an aircraft 110. An aircraft is a means of transport capable of deploying within the terrestrial atmosphere. For example, an aircraft can be an aeroplane or a helicopter (or else a drone). The aircraft comprises a flight cabin or a cockpit 120. Within the cockpit are situated piloting equipment 121 (so-called avionics equipment), comprising for example one or more onboard computers (means of computation, storage and saving of data), including an FMS, means of display or of viewing and inputting of data, means of communication, as well as (optionally) means of haptic feedback and a taxiing computer. A touch tablet or an EFB 122 may be found on board, in a portable manner or incorporated into the cockpit. The said EFB can interact (bilateral communication 123) with the avionics equipment 121. The EFB can also be in communication 124 with external computing resources, accessible through the network (for example "cloud computing" 125). In particular, the computations can be performed locally on the EFB or in a partial or total manner in the means of computation accessible through the network. The onboard equipment 121 is generally certified and regulated while the EFB 122 and the connected computerized means 125 are generally not (or to a lesser extent). This architecture makes it possible to inject flexibility on the EFB 122 side while ensuring controlled safety on the onboard avionics 121 side.

Among the onboard equipment are various screens. The ND screens (graphical display associated with the FMS) are generally disposed in the primary field of view, at "head-level", whilst the FMDs are positioned "head-down". All the information entered or computed by the FMS is grouped together on so-called FMD pages. Existing systems make it possible to navigate from page to page, but the size of the screens and the necessity not to place too much information on a page for its readability do not allow an overview of the entire current and future situation of the flight. The flight cabin crews of modern aircraft generally consist of two people, distributed on either side of the cabin: a pilot side and a copilot side. Business aircraft sometimes have only one pilot, and certain older or military transport aircraft have a crew of three people. Each views on their MMI the pages of interest to them. Two pages out of the hundred or so possible are generally displayed continually during the execution of the mission: the flight plan page first, which contains the information about the route followed by the aircraft (list of the next waypoints with their associated predictions in terms of distance, time, altitude, speed, fuel, wind). The route is divided into procedures, themselves consisting of points and the performance page thereafter, which contains the useful parameters for guiding the aircraft over the short term (speed to be followed, altitude ceilings, next changes of altitude). There also exists a multitude of other pages available onboard (the lateral and vertical revision pages, the information pages, pages specific to certain aircraft), i.e. generally a hundred or so pages.

Figure 2:
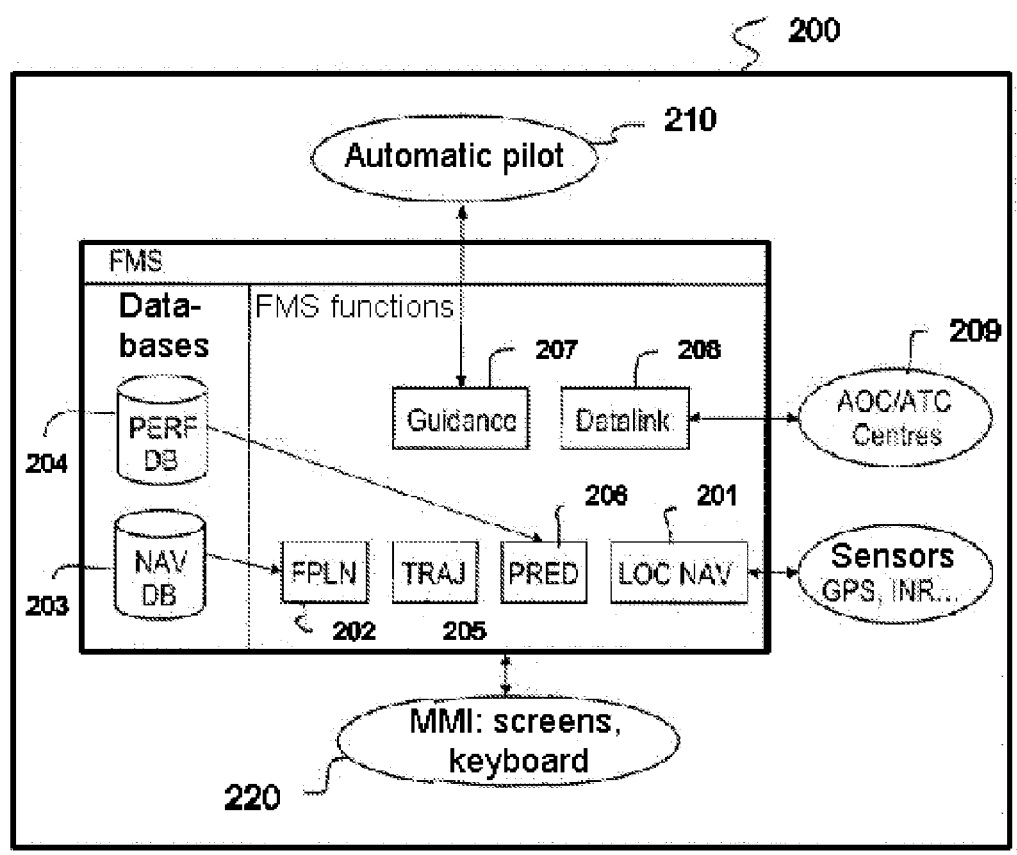
FIG. 2 schematically illustrates the structure and the functions of a flight management system of known FMS type.

FIG. 2 schematically illustrates the structure and the functions of a flight management system of known FMS type. A system of FMS type 200 disposed in the cockpit 120 and the avionics means 121 has a man-machine interface 220 comprising input means, for example formed by a keyboard, and display means, for example formed by a display screen, or else simply a touch-sensitive display screen, as well as at least the following functions:

Navigation (LOCNAV) 201, for performing optimal location of the aircraft as a function of the geolocation means such as geo-positioning by satellite or GPS, GALILEO, VHF radionavigation beacons, inertial platforms. This module communicates with the aforementioned geolocation devices;

Flight plan (FPLN) 202, for inputting the geographical elements constituting the "skeleton" of the route to be followed, such as the points imposed by the departure and arrival procedures, the route points, the air corridors, commonly referred to as "airways". An FMS generally hosts several flight plans (the so-called "Active" flight plan on which the aircraft is guided, the "temporary" flight plan making it possible to perform modifications without activating the guidance on this flight plan and "inactive" (so-called "secondary") work flight plans;

Navigation database (NAVDB) 203, for constructing geographical routes and procedures on the basis of data included in the bases relating to the points, beacons, interception or altitude legs, etc.;

Performance database, (PERFDB) 204, containing the craft's aerodynamic and engine parameters;

Lateral trajectory (TRAJ) 205, for constructing a continuous trajectory on the basis of the points of the flight plan, complying with the performance of the aircraft and the confinement constraints (RNAV for Area Navigation or RNP for Required Navigation Performance);

Predictions (PRED) 206, for constructing a vertical profile optimized on the lateral and vertical trajectory and giving the estimations of distance, time, altitude, speed, fuel and wind notably over each point, at each change of piloting parameter and at the destination, and which will be displayed to the crew. The methods and systems described affect or relate to this part of the computer.

Guidance (GUID) 207, for guiding in the lateral and vertical planes the aircraft on its three-dimensional trajectory, according to temporal constraints for example, while optimizing the speed of the aircraft, with the aid of the information computed by the Predictions function 206. In an aircraft equipped with an automatic piloting device 210, the latter can exchange information with the guidance module 207;

Digital data link (DATALINK) 208 for exchanging information (e.g. regarding flight, performance, relating to meteorology, etc) between the Flight plan/Predictions functions and the control centres or other aircraft 209.

one or more MMI screens 220. All the information entered or computed by the FMS is grouped together on display screens (FMD, NTD and PFD, HUD pages or the like).

The PFD (principal flight screen), comprises i) the FMA (flight modes announcer), which displays the acronyms of the logic modes of the automatic pilot and of the auto-throttle and ii) the directives in terms of heading, altitude (sometimes vertical speed), and speed on their respective scales (these displays are focused on the logic of the automatic pilot and of the auto throttle, those of the FMS are generally made less explicit).

The ND/VD navigation screen comprises i) a graphical display of the trajectory corresponding to the flight plan in the horizontal plane and ii) a graphical display of the trajectory corresponding to the flight plan in the vertical plane.

The multifunction screen (MFD) presents a textual dominant tree of pages which essentially allows the management of lists for interface with the FMS. The list of the points of the flight plan with associated predictions makes it possible (inter alia) to deduce the altitude directives, and the list of the performance data by flight phase makes it possible (inter alia) to understand the speed directives.

Figure 3:
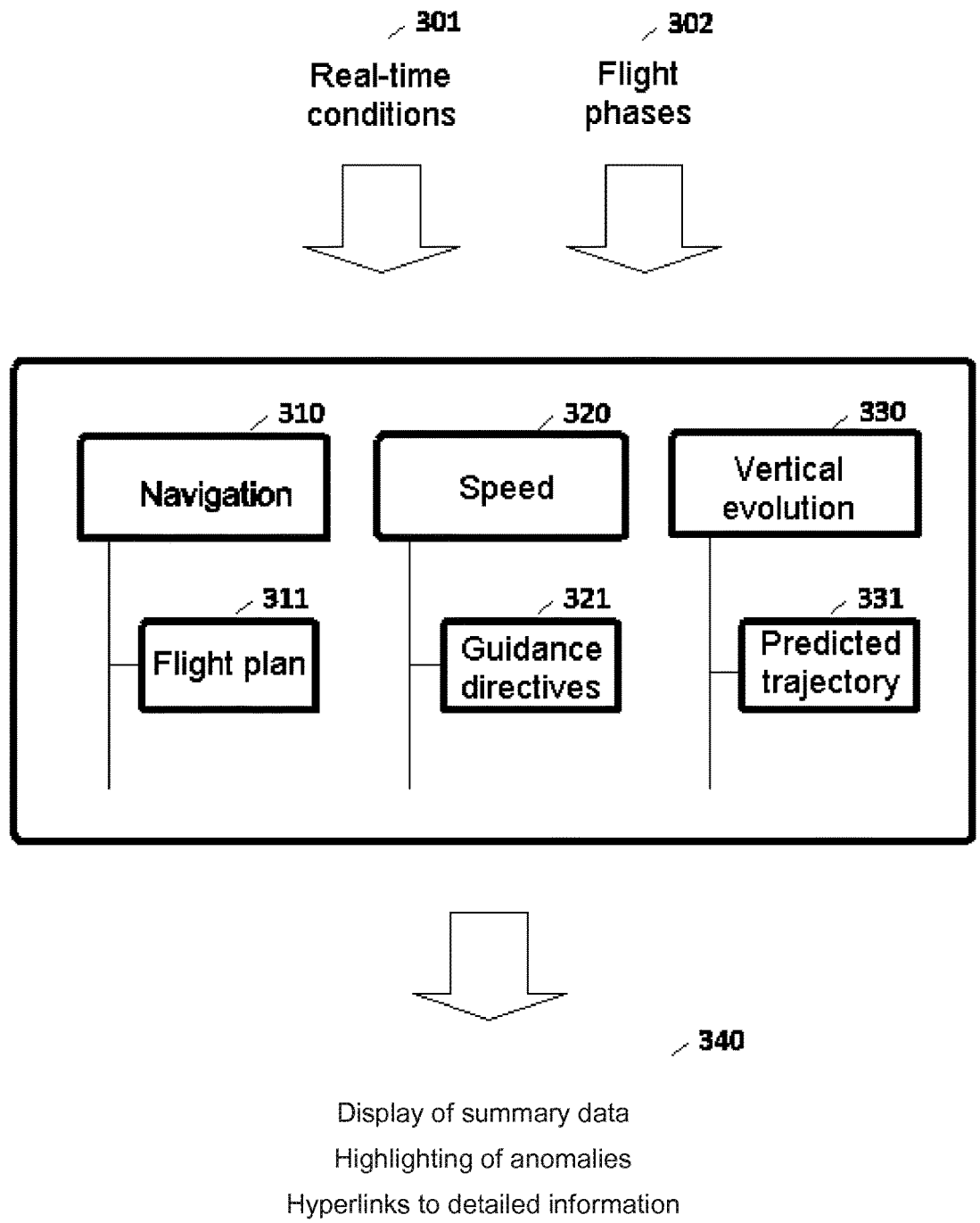
FIG. 3 illustrates an example of information management according to the invention.

FIG. 3 illustrates an example of information management according to the invention. The processes and systems presently disclosed are aimed among other aspects at explaining the behaviour of the information system, by distributing the information determined as being "essential" into various groups corresponding to each typology of directive (navigation 310, speed 320 and vertical evolution 330). These categories of directive are determined, at the very least influenced by the flight conditions determined in real time 301 and the various flight phases 302. Synthetic data displays 340 are produced as output, with if appropriate the highlighting of anomalies and hyperlinks (e.g. contextual) to more detailed related information or resources.

For each group of directives, the objectives pursued by the flight management system, the data or reasons or causality links explaining or justifying these objectives or directives, as well as the planned changes in regard thereto (if appropriate with temporal indications associated with the said changes, and if possible accompanied by explanations, contextual or of causality) will in particular be restored to the flight team (for example graphically, or by other auditory and/or sensory means).

For example, as regards navigation 310, information relating to the flight plan 311 (with contextually determined levels of detail) can be provided. Still as regards navigation 310, the information provided can be that already in common use according to the prior art for example, the RNP criterion applicable to the current flight segment, the uncertainty in position estimated by the system (acronym EPE for "Estimated Position Error") or ANP for "Actual Performance Navigation" depending on the system, and the principal navigation sensor used (GPS, DME/DME, VOR/DME, IRS . . . ). The hyperlink will for example afford access to the page making it possible to view the positions "position monitor". The crew's attention will for example be summoned in case of EPE/ANP incompatible with the applicable RNP, of error or of malfunction of one of the navigation sensors, of the possible need for alignment of the inertial platforms, or of excessive drift of the inertias. As regards speed 320, information relating to the guidance directives 321 can be provided (for example). Other examples will be provided hereinafter. As regards vertical evolution 330, information relating to the predicted trajectory 331 can be provided (for example). Other examples will be provided hereinafter.

The synthesis of the information of the flight guidance system constitutes a first level of information, which is constantly reupdated as a function of the progress of the flight. As a supplement, diverse devices make it possible to attract the pilot's attention on specific points. Finally, access shortcuts of hyperlink type, for example dynamic, that is to say dependent on flight context, are determined and are made available to the pilot, so as to access more ample information and details on request. These links or hyperlinks may turn out to be particularly advantageous, in particular in the cases where the state of the aircraft or of the flight phase in progress would be incompletely advised or else in case of anomaly.

The table of FIG. 4 illustrates a few examples of screens relating to the speed directives 320. According to the various flight phases 410 and as a function of specific conditions 420 during each of these flight phases, examples of screens 430 are illustrated together with the associated explanations 440 and examples of hyperlinks or actions 450. For example, the following may be displayed: a) the current target speed and the associated reasoning, for example displayed under the 10 NMs or according to other conditions; b) the distance to the next change of speed, for example when this change is planned in sequences or anticipated, or c) the altitude at which the change of speed will occur by default. The links 450 can for example comprise links or hyperlinks to the values of "following speed" (as well as the associated reasoning) or else to the FMS page for management of the "following speed".

This group of directives relating to the speed 320 is aimed at clarifying which speed directive proposed by the FMS it proposes ("what/current directive" and "why/current directive"), the temporal aspect associated with the next change of speed ("when") and the content of the next directive ("what/next directive" and "why/next directive").

Outside of the phases 410 of pre-flight, of takeoff, of approach and of landing, this group will be able in particular to indicate (A) the current speed directive (CAS or MACH for example); (B) its justification; (C) where and when the next change of speed is envisaged; and (D) the next speed directive.

With more details, the justification of the current speed directive will be able to comprise one or more of the following elements: (a) if the speed directive is dictated by a holding circuit speed, then the following might be displayed: i) a textual abstract or a small graphical representation of the circuit, ii) a hyperlink with access to the page for viewing and defining the parameters of the holding circuit; iii) the pilot's attention may be solicited in case of non-compliance with the circuit speed. If (b) the speed directive is dictated by a speed constraint of a point of the flight plan, then the following might be displayed: i) the type of the speed constraint, window/ceiling/floor, by a horizontal bar above and/or below the directive; ii) the identifier of the corresponding point; iii) a hyperlink will for example be able to afford access to the page making it possible to view and optionally to modify the constraint at the point in question; iv) the pilot's attention will be able to be solicited in case of non-compliance with the constraint. If (c) the speed directive is currently dictated by a speed limitation below a ceiling altitude, it will be possible to display (for example) i) the type of the speed constraint, window/ceiling/floor, by a horizontal bar above and/or below the directive; ii) the ceiling altitude; iii) a hyperlink will for example be able to afford access to the page making it possible to view and optionally to modify the speed limitation in question; iv) the pilot's attention will be able to be solicited in case of non-compliance with the limitation. If (d) the speed directive is dictated by an imposed cruising segment speed, it will be possible to display (for example) i) the type of the imposed speed, window/ceiling/floor, by a horizontal bar above and/or below the directive; ii) the identifier of the exit point of the segment; iii) a hyperlink will for example be able to afford access to the page for viewing and defining the parameters of the cruising segment; iv) the pilot's attention will be able to be solicited in case of non-compliance with the imposed speed. If (e) the speed directive corresponds to a criterion of speed computation by the FMS such as "cost index", "long range", "max climb", "turbulence", "RTA", "engine out" etc: i) it will be possible to display (for example) an abstract of the criterion and of its value; ii) a hyperlink will for example be able to afford access to the page for viewing and defining the parameter or the corresponding RTA (time constraint); iii) the pilot's attention will be able to be solicited when the predictions of the FMS envisage non-compliance with an RTA (time constraint).

It will also be possible to restore (C) "where" and "when" the next change of speed is envisaged (for example (i) there will be indication of the distance and/or the time remaining to the place where the change of speed is envisaged by the FMS, or, in the case where the change of speed must occur at a specified altitude, the altitude in question; ii) the pilot's attention will be able to be solicited in proximity to the change envisaged); (D) the next speed directive (same examples as the current directive).

During the pre-flight/takeoff phase, the following may be indicated: a) the characteristic takeoff speeds V1/VR/V2; b) a hyperlink will for example be able to afford access to the page for viewing and defining the takeoff parameters; c) the pilot's attention will be able to be solicited when these data are incorrectly advised.

During the approach/landing phase, the following may be indicated: a) the headwind or tailwind components, and right or left crosswind, with optionally a graphical symbol representing the wind; b) the approach speed envisaged; c) the landing flap configuration; d) a hyperlink will for example be able to afford access to the page for viewing and defining the landing parameters; e) the pilot's attention will be attracted in case of excessive wind, of overspeed or of under-speed on approach, or when the FMS prediction of the aircraft energy state on landing is too low or too high.

The table of FIG. 5 illustrates a few examples of screens relating to the directives of vertical evolution 330. The table provides a few examples of screens. According to the various flight phases 510 and as a function of specific conditions 520 during each of these flight phases, examples of screens 530 are illustrated together with the associated explanations 540 and examples of hyperlinks or actions 550. For example, it is possible to display the distance to the following altitude event and/or the description of the altitude event and/or the reasoning associated with this event (for example if available). The links 550 can for example comprise links or hyperlinks to the corresponding pages of the FMS.

This group of directives 530 is aimed at improving the understanding of the vertical trajectory and in particular at clarifying a) which is the element constraining the current vertical trajectory; b) if the current trajectory is or is not appropriate for complying with this constraint; and c) which are the parameters dimensioning the compliance with safety.

Outside of the pre-flight/takeoff and final approach/landing phases, this group will indicate (a) the distance and/or the time remaining before the next change of vertical trajectory; (b) a symbol or an explanation describing this next event, for example (i) a levelling off envisaged from a climb or a descent (the pilot's attention will be able to be solicited in proximity); (ii) climbing or descending envisaged from a holding level (the pilot's attention will be able to be solicited in proximity); (iii) a passing of an altitude constraint (the pilot's attention will be able to be solicited in proximity, or if the FMS predictions envisage the aircraft missing the constraint); (c) the element imposing the change of trajectory, for example (i) an altitude constraint at a point of the flight plan, then the following will for example be displayed: the type of the altitude constraint, window/ceiling/floor, by a horizontal bar above and/or below the directive and/or the identifier of the corresponding point and/or a hyperlink will for example be able to afford access to the page making it possible to view and optionally to modify the constraint at the point in question; the pilot's attention will be able to be solicited when the predictions of the FMS envisage non-compliance with the constraint. In this case, the following will for example be displayed: i) complementary information to help to rectify the situation (for example an envisaged altitude error or a necessary flight slope required in order to regain the constraint or, when descending, a position of the airbrakes that the FMS predicts as being necessary in order to comply with the constraint), ii) a cruising or "step" level (the following will for example be displayed: its altitude and/or a hyperlink which will for example be able to afford access to the page making it possible to view and optionally to modify the level or the cruising "steps" and/or the pilot's attention will be able to be solicited when the predictions of the FMS envisage that the cruising level is too high since it cannot be attained before the point at which the descent is begun, or is greater than the maximum altitude recommended for the mass envisaged at the end of the climb.

In the cruising phase, when the next envisaged change of trajectory is still far off, the following may for example be indicated: a) the maximum cruising level computed by the FMS b) the optimal cruising level computed by the FMS c) the maximum cruising level in case of engine fault computed by the FMS d) the safety altitude for the active flight plan segment e) the MORA (Minimum Off Route Altitude).

During the pre-flight/takeoff phase, the following will for example be indicated: a) the takeoff thrust level selected, b) the thrust reduction altitude and/or c) the climb thrust level selected.

To optimize the takeoff, there may exist several sequences of changes of thrust, with criterion in terms of altitude or distance. In this case, the current and future levels of thrust, and the distance to or the altitude of the change of thrust may be indicated.

During the final approach/landing phase, the following may be indicated: a) the altitude or the minimum descent or decision height, b) the minimum safety altitude in proximity to the airport, and/or c) the altitude to be regained in case of go-around.

Figure 6:
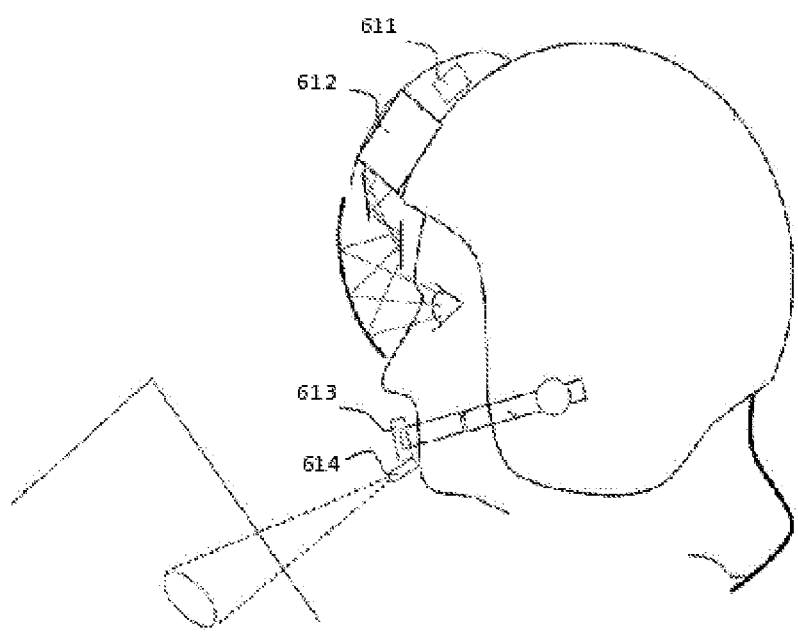
FIG. 6 illustrates various aspects relating to the man-machine interfaces for implementing the method according to the invention.

FIG. 6 illustrates various aspects relating to the MMIs for deploying the method according to the invention. As a supplement—or as a substitute—for screens of the FMS and/or EFB onboard computer, additional MMI means can be used. Generally, FMS avionics systems (which are systems certified by the air regulator and which may exhibit certain limitations in terms of display and/or ergonomics) may be advantageously complemented with non-avionics means, in particular with advanced MMIs. Among these advanced MMIs, certain embodiments of the invention may be implemented by means of augmented reality AR (e.g. projectors, spectacles, etc) and/or in virtual reality VR (e.g. visor, video-headset, etc). Certain embodiments may be mixed or hybrid AR/VR or stated otherwise may combine EVS means, the acronym standing for "Enhanced Vision System", and/or SVS means, the acronym standing for "Synthetic Vision System". For example, projection means can project the information onto the windscreen and/or interior elements of the aircraft cockpit.

In particular, the said man-machine interfaces can make use of virtual and/or augmented reality headsets. FIG. 6 shows an opaque virtual reality headset 610 (or a semi-transparent augmented reality headset or a headset with configurable transparency) worn by the pilot. The individual display headset 610 can be a virtual reality (VR) headset, or an augmented reality (AR) headset or a head-up sight, etc. The headset can therefore be a "head-mounted display", a "wearable computer", "glasses" or a video-headset. The headset can comprise computation and communication means 611, projection means 612, audio acquisition means 613 and video acquisition and/or video projection means 614 (for example used for the "scraping" of data accessible in an analogue manner from the cockpit or the flight cabin of the aircraft). One or more steps of the method can be implemented in all or part on such MMI systems.

The information displayed in the headset 610 can be entirely virtual (displayed in the individual headset), entirely real (for example projected onto the plane surfaces available in the real environment of the cockpit) or a combination of the two (in part a virtual display superimposed or fused with reality and in part a real display via projectors). The display can also be characterized by the application of predefined siting rules and display rules. For example, the man-machine interfaces (or the information) can be "distributed" (segmented into distinct portions, optionally partially redundant, and then apportioned) between the various virtual screens (e.g. 610) or real screens (e.g. FMS, TAXI).

The various steps of the process can be implemented in all or part on the FMS and/or on one or more EFBs. In a particular embodiment, all the information is displayed on the screens of the FMS alone. In another embodiment, the information associated with the steps of the process is displayed on the onboard EFBs alone. Finally, in another embodiment, the screens of the FMS and of an EFB can be used jointly, for example by "distributing" the information over the various screens of the various items of kit. Spatial distribution of the information, performed in an appropriate manner, can help to reduce the pilot's cognitive load and hence improve decision taking and increase flight safety.

The present invention can be implemented on the basis of hardware elements and/or software elements. It can be available in the guise of a computer program product on a computer readable medium. The medium can be electronic, magnetic, optical or electromagnetic. The computing means or resources can be distributed ("Cloud computing").

The invention claimed is:

1. A method implemented by computer configured to perform a management of a flight of an aircraft, the method comprising the steps of:
   receiving flight directives and flight information associated with the flight directives, a flight directive being of navigation/positioning type, and/or of guidance type in a horizontal/vertical plane and/or of speed/thrust type, the flight directive being received from a flight management system (FMS);
   determining a flight context of the aircraft;
   selecting, as a function of the said flight context determined, information from among information associated with the formulation of a directive and/or with a current flight directive and/or with a change of the flight directive; and
   sensorially restoring the selected information.

2. The method according to claim 1, the flight information comprising information associated with a formulation of one or more flight directives and/or information associated with a state of systems of the aircraft and/or information associated with an environment of the aircraft.

3. The method according to claim 1, the step of sensorially restoring the selected information comprising:
   a step of graphically displaying one or more items of information from among (a) a speed, (b) a thrust, (c) a flight phase directive, (d) a directive in terms of slope, (e) a ceiling or a floor, (e) a flight criterion, (f) an aerodynamic configuration, and (g) a flight procedure.

4. The method according to claim 1, the method furthermore comprising a step of providing a link to a resource in relation to a selected directive.

5. The method according to claim 1, the method further comprising:
   steps of:
      determining an anomaly in the flight of the aircraft and/or in a state of systems of the aircraft; and
      soliciting a pilot's attention.

6. The method according to claim 1, the flight context being determined in a manner repeated over time.

7. The method according to claim 1, the step of determining the flight context comprising applying predefined logic rules.

8. The method according to claim 1, wherein the step of sensorially restoring the selected information being performed in a visual and/or an auditory and/or a tactile and/or a vibratory manner.

9. The method according to claim 1, the step of sensorially restoring information comprising the application of predefined logic rules.

10. The method according to claim 1, the step of selecting information being configurable.

11. A non-volatile computer program comprising code instructions for carrying out the steps of the method according to claim 1 when said computer program is executed on a suitable computer device.

12. A system comprising the computer for carrying out the steps of the method according to claim 1.

13. The system according to claim 12, comprising a principal flight screen (PFD) and/or a navigation screen (ND/VD) and/or a multifunction screen (MFD).

14. The system according to claim 11, comprising avionic means of Flight Management System type and/or means of Electronic Flight Bag type and/or means of augmented and/or virtual reality.

* * * * *